UNITED STATES PATENT OFFICE.

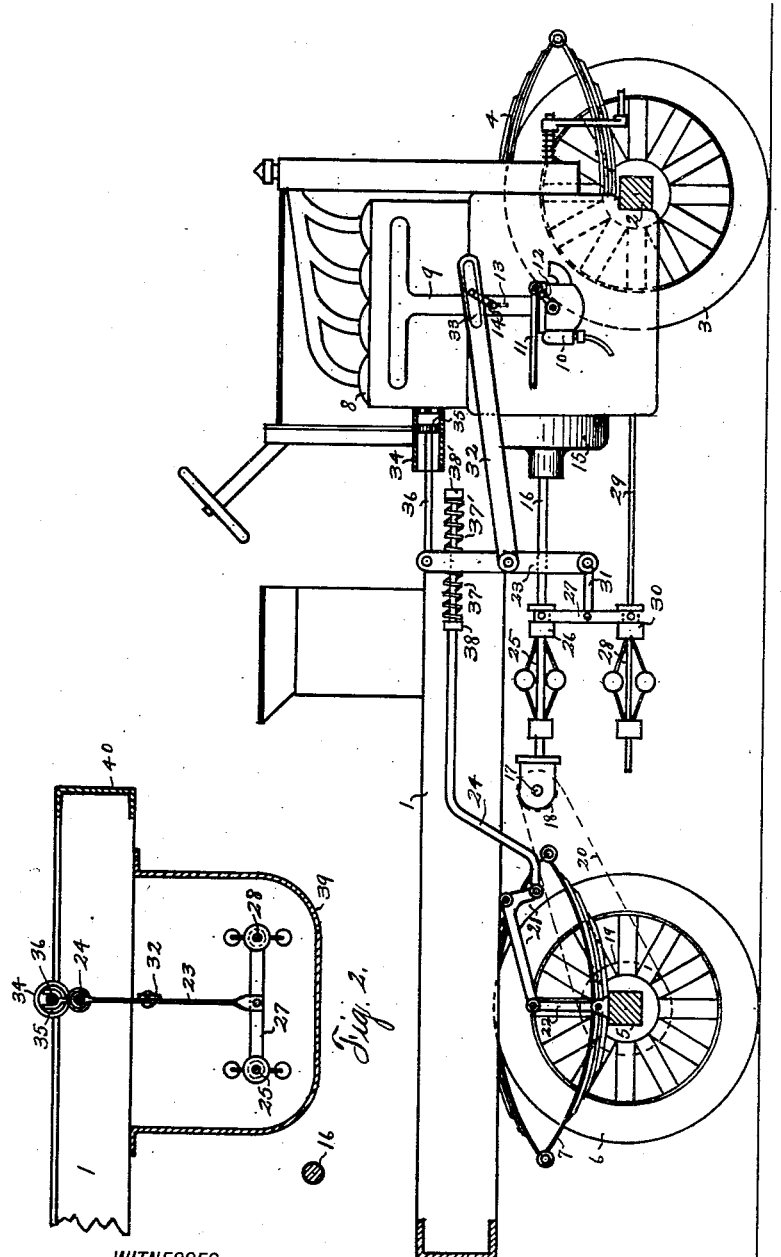

JOHN C. CARPENTER, OF LA PORTE, TEXAS.

SPEED-CONTROLLING MECHANISM FOR MOTOR-VEHICLES.

1,233,447.  Specification of Letters Patent.  Patented July 17, 1917.

Application filed July 9, 1915. Serial No. 38,900.

*To all whom it may concern:*

Be it known that I, JOHN C. CARPENTER, a citizen of the United States, residing at La Porte, in the county of Harris and State of Texas, have invented a certain new and useful Improvement in a Speed-Controlling Mechanism for Motor-Vehicles, of which the following is a specification.

My invention relates to new and useful improvements in automatic regulation of the speed of motor vehicles, and has particular application to motor trucks, whose speed should be limited in proportion to the load carried thereby and the inequalities of the road surface.

The objects of my invention are: First, to limit the vehicle to varying speeds proportionate to the static load on the vehicle; second, to limit the motor speed, when not in direct drive, to varying speeds in inverse ratio to the then speed of the vehicle; third, to effect a sudden throttling of the motor when the predetermined limit of speed or load, or both, has been exceeded; and, fourth, to prevent a sudden opening of the throttle after the throttle has been suddenly closed.

I attain these objects by the mechanism illustrated in the accompanying drawings, in which—

Figure 1 is a side elevation of a motor truck; and Fig. 2 is a rear elevation of the governors and dashpot, and their connecting link work, arranged compactly within a housing in the preferred manner.

Referring particularly to the drawings, wherein like numerals of reference refer to similar parts in each of the figures, the numeral 1 refers to the frame of a motor driven vehicle, resiliently mounted on front axle 2 and front wheels 3 by means of front springs 4 and on rear axle 5 and rear wheels 6 by means of rear springs 7. The numeral 8 designates an internal combustion engine, which is the prime mover of the vehicle, and has a mixture intake pipe 9 leading from the carbureter 10. The numeral 11 designates the rod for manual or pedal regulation of the carbureter throttle (not shown) by means of the throttle arm 12. The numeral 13 designates the control throttle, normally held open by a spring (not shown), and operated by the throttle arm 14, by means of which the engine is throttled whenever the predetermined limits of speed and load are exceeded. The clutch and gear box, affording varying ratios between motor and vehicle speeds, is designated by the numeral 15. The drive from the motor 8 to the rear wheels 6 is taken through the clutch and gear box 15, the propeller shaft 16, the jack shaft 17, the jack shaft sprockets 18, the rear wheel sprockets 19 and the chains 20.

The frame 1 supports a bell crank 21, connected to the rear axle 5 by means of the link 22, so that the relative motion of the frame 1 and the rear axle 5, accompanying the deflection and reaction of the springs 7, is resolved into a force for operating the bell crank 21. The numeral 23 designates a floating control lever, arranged to be operated by the bell crank 21 by means of the connecting link 24. The numeral 25 designates a centrifugal governor, mounted on and driven by the propeller shaft 16, and operating a sliding collar 26, which engages and operates the lever 27. The numeral 28 designates another centrifugal governor, driven by the motor 8 through a shaft 29, and operating a sliding collar 30, which also engages and operates the lever 27. The governor 25 is responsive to changes in vehicle speed and the governor 28 is responsive to changes in motor speed, and each operates alternatively as power and fulcrum to regulate the floating lever 27. The floating lever 27 operates the floating lever 23 by means of the connecting link 31. The control throttle arm 14 is connected to the floating lever 23 by means of a link 32, having a longitudinal slot 33 at the throttle end, whereby motion is transmitted to the throttle arm 14 only after the link 32 has reached a predetermined position. The length of the throttle arm 14 and the range of movement of the link 32 will determine the speed with which the throttle 13 is snapped shut. The link 32 is responsive to changes in vehicle speed by reason of its connection with governor 25 through the levers 23 and 27 and the link 31, is responsive to changes in motor speed by reason of its connection with governor 28 through the levers 23 and 27 and the link 31, and is responsive to changes in vehicle load, as evidenced by deflection and reaction of the springs 7, by reason of its connection with the link work designated by the numerals 1, 5, 21, 22, 23 and 24. The governors 25 and 28 and the bell crank 21, each, operate alternatively as power and fulcrum to control the throttle 13.

The numeral 34 designates the cylinder of a dashpot of conventional form, for permitting free movement in one direction and requiring retarded movement in the opposite direction. The dashpot piston is designated by the numeral 35, is provided with the usual check valve (not shown) and is operated by the piston rod 36, connected with the floating lever 23 and operated thereby. The check valve is so arranged as to permit the dashpot piston 35 to freely move toward the open end of the dashpot cylinder 34, but to retard movement in the opposite direction.

The link 24 has a resilient connection with the floating lever 23, which comprises the compression springs 37 and 37', interposed between the floating lever 23 and the collars 38 and 38' respectively, carried by the link 24. This resilient connection is designed to relieve stress upon the throttle arm 14 and the dashpot piston 35, and to permit the dashpot to perform its proper function regardless of the relative movement of the frame and axle members.

In Fig. 1 the governors 25 and 28 are shown in a vertical plane for the purpose of better illustration, while in Fig. 2 they are shown in a horizontal plane, with the dashpot mounted above, and all inclosed in a housing 39 carried between the propeller shaft 16 and the side channel iron 40 of the frame member 1. In this arrangement the governors and dashpot are constructed as a unit, completely housed, and may be located as desired within the frame member, each governor being driven by a steel cable revolving in a casing.

The words "frame member" are used in these specifications to indicate that portion of the vehicle which is resiliently supported upon the axle members. The words "axle member" are used in these specifications to indicate that portion of the vehicle which resiliently supports the frame member. In the drawing there are two axle members.

The word "load" is used in these specifications to indicate the downward thrust upon the vehicle springs, whether caused by static load or by inequalities in the road surface, and is not limited to periods when the springs are in equilibrium.

It is useless to attempt to regulate the speed of a motor by a governor which closes the throttle in direct ratio to increase in motor speed, and still use the full power of the motor. A governor is required, therefore, which will snap the throttle closed when the predetermined speed is exceeded, and at the same time permit full throttle at allowable speeds and loads.

The motor speed permitted should be higher if in low or intermediate gear, as it has been demonstrated that it is impossible to get a vehicle out of trouble under certain road conditions without the full power of the motor, with the assistance of the prompt engagement of the clutch. In this case motor speed means motor power. It is obvious that, in direct drive with clutch engaged, a governor device responsive to motor speed and a governor device responsive to vehicle speed are, alike, responsive to changes in vehicle speed.

The motor speed should also vary according to the static load on the vehicle, a higher speed being permitted when empty than when loaded. The motor speed should be reduced when traveling over uneven road surfaces, whether loaded or empty, as road shocks are more destructive of truck and tires than static load.

All of these advantages are attained in my device. Novelty is disclaimed in respect to speed regulating governors, responsive to either motor speed or vehicle speed, which are old in the art.

The operation of my device is as follows: In starting the vehicle in low gear, the governor 28 (responsive to motor speed) will operate on the lower end of lever 27, while the upper end of lever 27, will remain stationary until governor 25 operates it in response to vehicle speed. This will permit a higher motor speed when in low gear, as the lower end of lever 23 is operated in proportion to the average speed of the two governors. When second speed is used, the average speed of the two governors is nearer the speed of the motor driven governor 28. When in direct drive the two governors operate synchronously and the lower end of lever 23 is operated in proportion to both vehicle and motor speeds.

When the predetermined vehicle speed, without load and on smooth roads, say 15 m. p. h., has been exceeded, the governors 25 and 28 operate upon the lower end of lever 23 to close the throttle 13. If, with full load and on smooth roads, the vehicle is to be limited to, say, 10 m. p. h., the downward stress upon the springs 7 will cause the link work 21, 22 and 24 to operate upon the upper end of lever 23 and close the throttle 13 at speeds above 10 m. p. h. If the rear wheels drop into a depression in the road surface, the downward stress on the springs 7 will be increased and the link work will close the throttle 13 at speeds of 10 m. p. h. or under, depending upon the degree of stress, and the throttle 13 will be held closed by the dashpot 34, 35 and 36 so that an immediate application of power is impossible, and momentum is lost. A few experiences of this kind will teach a driver to go slowly over abrupt elevations and depressions in the road surface. If it were not for the dashpot control, the throttle 13 would open and shut with the relative movement of the frame and axle members. As it is arranged the throttle 13 will act as a motor brake until released by the dashpot.

If the vehicle is overloaded, it is obvious that the throttle 13 will be closed at a lower speed than with merely full load, and the device may be so adjusted that, with a destructive overload, it will be impossible to move the vehicle.

Since the controlling mechanism may be sealed by the manufacturer against interference by the owner or driver, and the guarantee made voidable by the manufacturer in case the controlling mechanism is tampered with, the manufacturer is provided with ample protection against overloading and overspeeding of the vehicle until the guarantee expires. Then the owner, when he can no longer look to the manufacturer for repairs and replacements, will be interested in protecting his vehicle against overloading and overspeeding, and can seal these devices against interference by his driver.

This device is designed to merely check motor speed, not to regulate it. This latter function may be satisfactorily performed by my speed regulator, U. S. Patent No. 972,815, which permits full throttle opening almost up to full motor speed, while permitting instant manual adjustment by the driver for the desired speeds, which are automatically maintained by the motor driven governor 28. This device operates upon the carbureter throttle and is independent of throttle 13. The accelerator pedal may be used with this device in the usual manner.

I claim:

1. In a device of the character described the combination with a vehicle, having an internal combustion motor for propelling the same, a carbureting device for supplying a motive fluid to said motor, a device for controlling the application of said motive fluid to said motor a device for transmitting motion from said motor to said vehicle, a frame member, an axle member, a resilient member supporting said frame member upon said axle member; of link work connecting said frame member and axle member and being connected directly to said motive fluid controlling device, said link work being operated by said frame and axle members upon their relative movement, and operating said motive fluid controlling device.

2. In a device of the character described, the combination with a vehicle, having a motor for propelling the same, a device for controlling the application of motive fluid to said motor, a device for transmitting motion from said motor to said vehicle, a frame member, an axial member, and a resilient member supporting said frame member upon said axle member; of link work connecting said frame member, axle member and motive fluid controlling device, operated by said frame and axle members upon their relative movement and operating said motive fluid controlling device, and a dashpot connected with and operated by said link work, for permitting free closing of said motive fluid controlling device and preventing free opening thereof.

3. In a device of the character described, the combination with a vehicle, having a motor for propelling the same, a device for controlling the application of motive fluid to said motor, a device for transmitting motion from said motor to said vehicle, a frame member, an axle member, and a resilient member supporting said frame member upon said axle member, of link work connecting said frame member, axle member and motive fluid controlling device, operated by said frame and axle members upon their relative movement and operating said motive fluid controlling device, and a dashpot resiliently connected with and operated by said link work, for permitting free closing of said motive fluid controlling device and preventing free opening thereof.

4. In a device of the character described, the combination with a vehicle, having a motor for propelling the same, a device for controlling the application of motive fluid to said motor, and a device for transmitting motion from said motor to said vehicle; of a governor device responsive to motor speed, a governor device responsive to vehicle speed, and a floating lever interconnecting said governors and said motive fluid controlling device so as to operate upon the two former alternatively as fulcrums and operate said motive fluid controlling device.

5. In a device of the character described, the combination with a vehicle, having a motor for propelling the same, a device for controlling the application of motive fluid to said motor, a device for transmitting motion from said motor to said vehicle, a frame member, an axle member, and a resilient member supporting said frame member upon said axle member; of a governor device responsive to motor speed, link work connecting said frame member and axle member and operated by said frame and axle members upon their relative movement, and a floating control lever interconnecting said governor device, said link work and said motive fluid controlling device so as to operate upon the two former alternatively as fulcrums and operate said motive fluid controlling device.

6. In a device of the character described, the combination with a vehicle, having a motor for propelling the same, a device for controlling the application of motive fluid to said motor, a device for transmitting motion from said motor to said vehicle, a frame member, an axle member, and a resilient member supporting said frame member upon said axle member; of a governor device responsive to vehicle speed, link work connecting said frame member and axle member and operated by said frame and axle members upon their relative movement, and a floating control lever interconnecting said governor device, said link work and said motive fluid controlling device so as to operate upon the two former alternatively as fulcrums and operate said motive fluid controlling device.

7. In a device of the character described, the combination with a vehicle having a motor in operative connection with the propelling mechanism thereof, a mechanism controlling the application of motive fluid to said motor, of a governor responsive to motor speed, a floating lever, actuated by said governor and connected to and actuating said motive fluid controlling mechanism and a link work influenced by the vehicle load and actuating said lever.

8. In a device of the character described, the combination with a vehicle having a load carrying frame, supporting means whereon the frame is resiliently mounted, a motor in operative connection with the propelling mechanism of the vehicle and a motive fluid controlling mechanism, of a governor responsive to motor speed, a floating lever actuated by said governor and connected to and actuating said motive fluid controlling mechanism, and a link work actuated by the relative movement of said frame and its supporting means and actuationg said lever.

9. In a device of the character described, the combination with a vehicle having a load carrying frame, supporting means whereon the frame is resiliently mounted, a motor in operative connection with the propelling mechanism of the vehicle and a motive fluid controlling mechanism, of a governor responsive to vehicle speed, a floating lever actuated by said governor and connected to and actuating said motive fluid controlling mechanism and a link work actuated by the relative movement of said frame and its supporting means and actuating said lever.

10. In a device of the character described, the combination with a vehicle including a load carrying frame, means whereon the frame is resiliently mounted, a motor for propelling the vehicle, a means controlling the application of motive fluid to the motor, of two governors responsive to engine and vehicle speed, respectively, a floating lever actuated by said governors alternatively and actuating said motive fluid controlling means and a mechanism actuated by the relative movement of said frame and its supporting means and actuating said lever.

11. In a device of the character described the combination with a vehicle having an internal combustion motor for propelling the same, a carbureting device for supplying a motive fluid to said motor, a device for controlling the application of said motive fluid to said motor, a device for transmitting motion from said motor to said vehicle, a frame member, an axle member, a resilient member supporting said frame member upon said axle member; of link work connecting said frame member and axle member and being connected with, but having an independent movement relative to, said motive fluid controlling device, said link work being operated by said frame and axle members upon their relative movement, and operating said motive fluid controlling device.

In testimony whereof I have signed my name to this specification in the presence of two subscribing witnesses.

JOHN C. CARPENTER.

Witnesses:
T. A. LIDDELL,
J. A. WATSON.